(12) United States Patent
Tolbert et al.

(10) Patent No.: US 10,680,231 B2
(45) Date of Patent: Jun. 9, 2020

(54) MESOPOROUS NICKEL-IRON-MANGANESE-ALLOY BASED METAL/METAL OXIDE COMPOSITE THICK FILM CATALYSTS

(71) Applicant: THE REGENTS OF THE UNIVERSITY OF CALIFORNIA, Oakland, CA (US)

(72) Inventors: Sarah Tolbert, Los Angeles, CA (US); Eric Detsi, Philadelphia, PA (US); Benjamin Lesel, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 13 days.

(21) Appl. No.: 15/990,650

(22) Filed: May 27, 2018

(65) Prior Publication Data
US 2018/0351155 A1    Dec. 6, 2018

Related U.S. Application Data

(63) Continuation of application No. PCT/US2016/063995, filed on Nov. 29, 2016.
(Continued)

(51) Int. Cl.
*H01M 4/02*    (2006.01)
*H01M 8/0232*    (2016.01)
(Continued)

(52) U.S. Cl.
CPC ............. *H01M 4/02* (2013.01); *B01J 23/78* (2013.01); *B01J 23/80* (2013.01); *B01J 23/8476* (2013.01);
(Continued)

(58) Field of Classification Search
CPC ........ H01M 8/02; H01M 8/04; H01M 8/0232; H01M 4/04
See application file for complete search history.

(56) References Cited

U.S. PATENT DOCUMENTS

2005/0205431 A1   9/2005  Nguyen
2011/0192728 A1   8/2011  Nguyen

FOREIGN PATENT DOCUMENTS

KR    1020140087714 A   7/2014
KR      101561966 B1    10/2015
WO        0142536 A1     6/2001

OTHER PUBLICATIONS

Machine Translation of: KR 10-1561966, Kim et al., Oct. 20, 2015.*
(Continued)

*Primary Examiner* — Kenneth J Douyette
(74) *Attorney, Agent, or Firm* — O'Banion & Ritchey LLP; John P. O'Banion

(57) ABSTRACT

Selective alloy corrosion is used to synthesize a robust and ultrafine mesoporous NiFeMn-based metal/metal oxide oxygen evolving catalyst with ligament and pore sizes in the range of 10 nm and a BET surface area of 43 $m^2/g$. As an oxygen evolving catalyst, the mesoporous catalyst exhibits high stability (>264 hours) at a high current density (500 $mA/cm^2$) with a low overpotential (360 mV) using a moderate electrolyte concentration (1 M KOH). The catalyst is made from non-precious metals and its fabrication is straight forward and directly applicable to large-scale synthesis.

16 Claims, 10 Drawing Sheets

Related U.S. Application Data

(60) Provisional application No. 62/260,623, filed on Nov. 29, 2015.

(51) Int. Cl.

| | | |
|---|---|---|
| *C25B 1/10* | (2006.01) | |
| *C25B 9/08* | (2006.01) | |
| *C25B 11/04* | (2006.01) | |
| *C25B 11/03* | (2006.01) | |
| *C23F 1/00* | (2006.01) | |
| *B01J 37/06* | (2006.01) | |
| *B01J 23/80* | (2006.01) | |
| *B01J 23/889* | (2006.01) | |
| *B01J 35/10* | (2006.01) | |
| *B01J 23/847* | (2006.01) | |
| *B01J 23/78* | (2006.01) | |
| *B01J 35/00* | (2006.01) | |
| *C22C 38/04* | (2006.01) | |
| *C22C 38/08* | (2006.01) | |
| *B82Y 30/00* | (2011.01) | |

(52) U.S. Cl.
CPC ....... *B01J 23/8892* (2013.01); *B01J 35/0033* (2013.01); *B01J 35/1061* (2013.01); *B01J 37/06* (2013.01); *C22C 38/04* (2013.01); *C22C 38/08* (2013.01); *C23F 1/00* (2013.01); *C25B 1/10* (2013.01); *C25B 9/08* (2013.01); *C25B 11/035* (2013.01); *C25B 11/0447* (2013.01); *H01M 8/0232* (2013.01); *B01J 35/1014* (2013.01); *B01J 2523/00* (2013.01); *B82Y 30/00* (2013.01); *H01M 2004/021* (2013.01); *H01M 2004/027* (2013.01); *H01M 2004/028* (2013.01); *H01M 2300/0005* (2013.01); *H01M 2300/0014* (2013.01); *Y02E 60/366* (2013.01)

(56) References Cited

OTHER PUBLICATIONS

Korean Intellectual Property Office (KIPO), International Search Report and Written Opinion dated Mar. 13, 2017, related PCT international application No. PCT/US2016/063995, pp. 1-16, claims searched, pp. 17-20.

Rosalbino, F. et al., "Electrocatalytic activity of Ni—Fe—M (M=Cr, Mn, Cu) sintered electrodes for hydrogen evolution reaction in alkaline solution", Journal of Electroanalytical Chemistry, 2013, vol. 694, pp. 114-121, noting abstract and pp. 114, 115.

\* cited by examiner

MESOPOROUS NICKEL-IRON-MANGANESE-ALLOY BASED METAL/METAL OXIDE COMPOSITE THICK FILM CATALYSTS

CROSS-REFERENCE TO RELATED APPLICATIONS

This application is a 35 U.S.C. § 111(a) continuation of PCT international application number PCT/US2016/063995 filed on Nov. 29, 2016, incorporated herein by reference in its entirety, which claims priority to, and the benefit of, U.S. provisional patent application Ser. No. 62/260,623 filed on Nov. 29, 2015, incorporated herein by reference in its entirety. Priority is claimed to each of the foregoing applications.

The above-referenced PCT international application was published as PCT International Publication No. WO 2017/091832 on Jun. 1, 2017, which publication is incorporated herein by reference in its entirety.

STATEMENT REGARDING FEDERALLY SPONSORED RESEARCH OR DEVELOPMENT

This invention was made with Government support under DE-SC0001342 and DE-SC0014213, awarded by U.S. Department of Energy; and under 1S10RR23057, awarded by the National Institutes of Health. The Government has certain rights in the invention.

INCORPORATION-BY-REFERENCE OF COMPUTER PROGRAM APPENDIX

Not Applicable

BACKGROUND

1. Technical Field

The technology of this disclosure pertains generally to electrodes and oxygen evolution catalysts and nanoscale structure fabrication methods, and more particularly to an active and robust oxygen evolution nanostructured NiFe-based oxygen evolution catalyst of a nickel-iron-manganese alloy based metal/metal oxide composite made by selective alloy corrosion.

2. Background Discussion

Rising global energy demands and finite supplies will inevitably lead to shortages in fossil fuels. Concerns about climate change, attributed to emissions from the use of fossil fuels, have intensified the need for developing viable alternative fuels for electricity generation and combustion in transportation or heat production.

Hydrogen has been suggested as a valid alternative to fossil fuels because combustion produces water as the primary emission product. Hydrogen can also be an effective energy carrier when stored and used with fuel cells to generate electricity.

Although there is an increased public awareness of the need for alternative clean fuels, current hydrogen production technologies use fossil fuels and steam reformation of natural gas, gasified coal, or gasified heavy oil to produce hydrogen.

Current hydrogen production using electrolysis of water amounts to only about 4% of the total hydrogen production worldwide. Water electrolysis has the advantage of producing very pure hydrogen (>99.9%) using an electrolyzer. Alkaline electrolyzers and polymer electrolyte membrane (PEM) electrolyzers are the two main types of electrolyzers that are used to split water into its constituents with electrical current.

Conventional alkaline electrolyzer cells have two electrodes connected to a direct current source that operate in a liquid alkaline electrolyte solution of potassium hydroxide or sodium hydroxide separated into two reaction zones by a semipermeable membrane that separates the product gases and transports hydroxide ions from one electrode to the other. Hydrogen is formed on the cathode side under the application of a direct current. The resulting hydroxide ions pass through the gas-tight separating membrane and recombine with oxygen on the anode side of the cell to form water. The alkaline electrolyte (i.e. KOH) is not consumed in the process and only water is needed to continuously replace the water that is used up in the production of hydrogen and oxygen.

A major challenge in the field of water electrolysis is the scarcity of oxygen-evolving catalysts that are inexpensive, highly corrosion-resistant, suitable for large-scale applications and able to oxidize water at high current densities and low overpotentials. Most unsupported, non-precious metals oxygen-evolution catalysts require at least about 350 mV overpotential to oxidize water with a current density of 10 $mA/cm^2$ in 1 M alkaline solution.

State-of-the-art oxygen evolution catalysts supported on commercially available three-dimensional nickel foams with pore sizes in the submillimeter and millimeter ranges exhibit exceptionally good catalytic activities. For example, Co-based oxygen-evolving catalyst can achieve a current density of 1 $mA/cm^2$ at about 410 mV overpotential near neutral pH in thin film format. When this catalyst is electrodeposited onto a three-dimensional nickel foam scaffold, its activity towards water oxidation near neutral pH is further increased, resulting in a current density of 100 $mA/cm^2$ at 363 mV overpotential with stability of over 90 hours. NiFe-based material systems represent another promising class of high-performance non-precious metals oxygen evolution catalysts. Thin film NiFe-based oxygen evolution catalysts can deliver a current density of 10 $mA/cm^2$ at about 350 mV overpotential in 1 M alkaline solutions. When NiFe-based oxygen evolution catalysts are grown onto three-dimensional nickel foams, they only require 240 mV overpotential to deliver a current density of 10 $mA/cm^2$ in 1 M NaOH solution. In 10 M KOH, they also require only 240 mV overpotential to deliver a current density of about 500 $mA/cm^2$ over 2 hours.

Oxygen-evolving catalysts supported onto three-dimensional nickel foams have both positive and negative attributes. On the positive side, the high intrinsic electrical conductivity of the nickel foam allows it to act as an effective current collector for the catalyst. In addition, the porous architecture of open cell nickel foams favors effective mass transfer of both ionic species and gas molecules at the catalyst/electrolyte interface. The main drawback for the usage of commercially available nickel foams for these types of applications is their very large pore sizes, which is commonly in the submillimeter to millimeter range. Consequently, the specific surface area of open cell nickel foams is very low, less than 1 $m^2/g$ depending on the pore size distribution. Concretely, it means that the total effective interface surface area of a 1 $cm^2$ area film of open cell nickel foam foil with a thickness of 10 μm can be less than 1 $cm^2$.

In other words, the surface area of a dense nickel foil can be higher than that of a porous nickel foam foil.

Therefore, there is a need for fabrication methods for producing efficient, mechanically stable, nanoscale oxygen evolution catalysts that are inexpensive, and easy to process for cost effective electrolysis.

BRIEF SUMMARY

The present technology provides a robust nanostructured porous NiFe-based oxygen evolution catalyst made by selective alloy corrosion. Dealloying is used to produce a high-performance, robust, and ultrafine mesoporous NiFeMn-based oxygen-evolving catalysts with average ligament and pore sizes on the order of about 10 nm. The material has a BET surface area of approximately 43 $m^2/g$ and high electrical conductivity.

In contrast to nickel foams, which exhibit very low interfacial surface areas, the three-dimensional mesoporous structures of the present technology can exhibit much larger interfacial surface areas, since the specific surface area scales inversely with the average pore size. These mesoporous structures with pore size distributions in the nanometer regime produce catalytic activity in the oxygen-evolving catalysts that is greatly improved over conventional nickel foams.

Nanoporous metals with mesopores (pore size <50 nm) or macropores (pore size >50 nm) may be produced by dealloying, a top-down nanosynthesis technique where the most chemically active element from a dense parent alloy is selectively removed using acidic or alkaline aqueous electrolytes, sometimes in combination with a bias voltage.

For the synthesis of the mesoporous NiFeMn-based catalyst, the preferred parent alloy is a ternary system with the composition $Ni_{15}Fe_{20}Mn_{65}$ at. %. The mesoporous catalyst in this illustration is obtained from the parent alloy by free-corrosion dealloying (i.e. without the assistance of a bias voltage) in a 1 M aqueous solution of $(NH_4)_2SO_4$. During the dealloying process, both Fe and Mn, which are more chemically reactive than Ni, gradually dissolve in the weak acid corroding solution. Since the Mn dissolves more readily than Fe, the initial parent alloy composition is chosen to include enough Mn to produce the desired nanoporous architecture, and enough Fe to reach a near optimal Fe:Ni ratio after the majority of the Mn is removed from the structure.

In general, nanoparticulate NiFe-based catalysts exhibit optimal activity towards water oxidation at a Fe:Ni ratio of about 0.5. Therefore, the present methods stop the dealloying process when the Fe:Ni ratio in the bulk of the parent alloy drops from about 1.3 down to about 0.5. This corresponds to a bulk elemental composition of about $Ni_{60}Fe_{30}Mn_{10}$ at. % in the final dealloyed mesoporous catalyst, as determined by both EDS and WDS.

Mn is commonly removed from Mn-rich nickel alloys by dealloying via potentiostatic control using a negative bias voltage. Such a negative bias voltage minimizes the electroadsorption of negatively charged oxygen species ($OH^-$, $O_2^-$), and thus prevents spontaneous oxide formation in dealloyed mesoporous nickel-based systems, resulting in nearly oxide-free mesoporous nickel structures. The present technology, however, the process is interested in producing oxide-rich mesoporous NiFe-based systems, since the oxide plays an important role in the oxygen evolution reaction. Therefore, partial oxidation of the dealloyed material is desirable and a bias voltage is not used.

In 1 M KOH, the produced final catalyst material exhibits a catalytic activity towards water oxidation of 500 $mA/cm^2$ at 360 mV overpotential and is stable for over eleven days. This exceptional performance is attributed to three factors. First, the small size of the ligaments and pores in the mesoporous catalyst (about 10 nm) results in a high BET surface area (43 $m^2/g$) and therefore a high density of oxygen-evolution catalytic sites per unit mass. Second, the open porosity facilitates effective mass transfer at the catalyst/electrolyte interface. Third, the high bulk electrical conductivity of the mesoporous catalyst allows for effective current flow through the electrocatalyst, making it possible to use thick films with a high density of active sites and about $3 \times 10^4$ $cm^2$ of catalytic area per $cm^2$ of electrode area. The resulting mesoporous catalyst is thus attractive for alkaline electrolyzers where water-based solutions are decomposed into hydrogen and oxygen as the only products, driven either conventionally or by photovoltaics.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

Figure 7A:
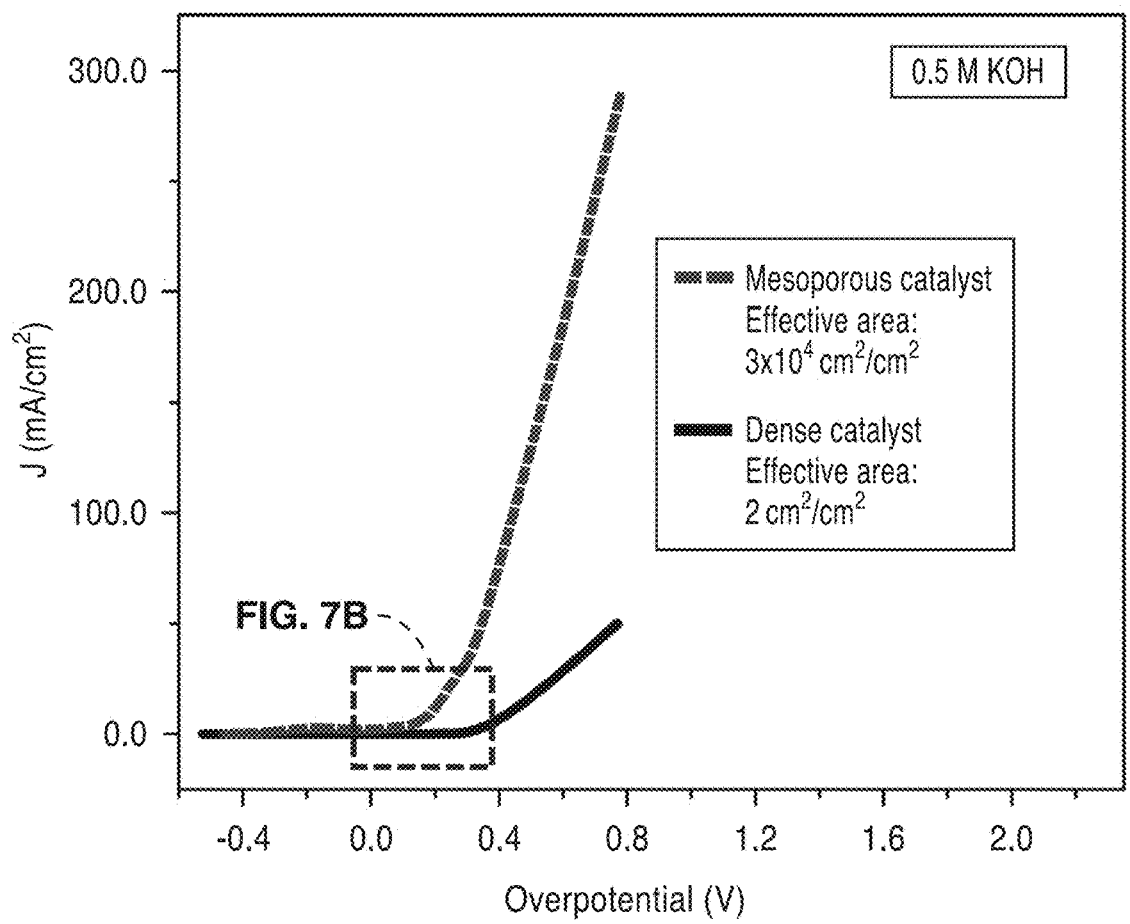

FIG. 7A is a graph showing catalytic activities in 0.5 M KOH. Linear sweep voltammograms obtained from the mesoporous $Ni_{60}Fe_{30}Mn_{10}$ metal/metal-oxide catalyst and a dense $Ni_{60}Fe_{30}Mn_{10}$ catalyst counterpart at a sweep rate of 1 mV/s in 0.5 M KOH.

Figure 7B:
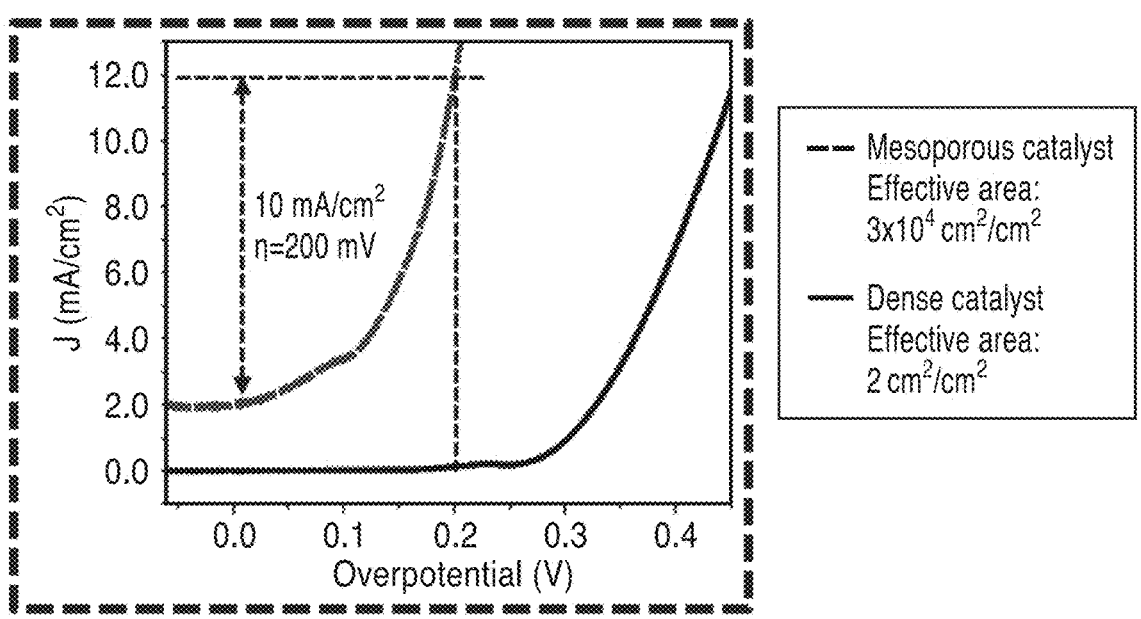

FIG. 7B is a detailed sweep graph of the dashed box of FIG. 7A. The mesoporous catalyst achieves 10 mA/cm² at only 200 mV, whereas the dense catalyst counterpart does not achieve 10 mA/cm² until 430 mV (sweep rate of 1 mV/s; 0.5M KOH).

Figure 8A:
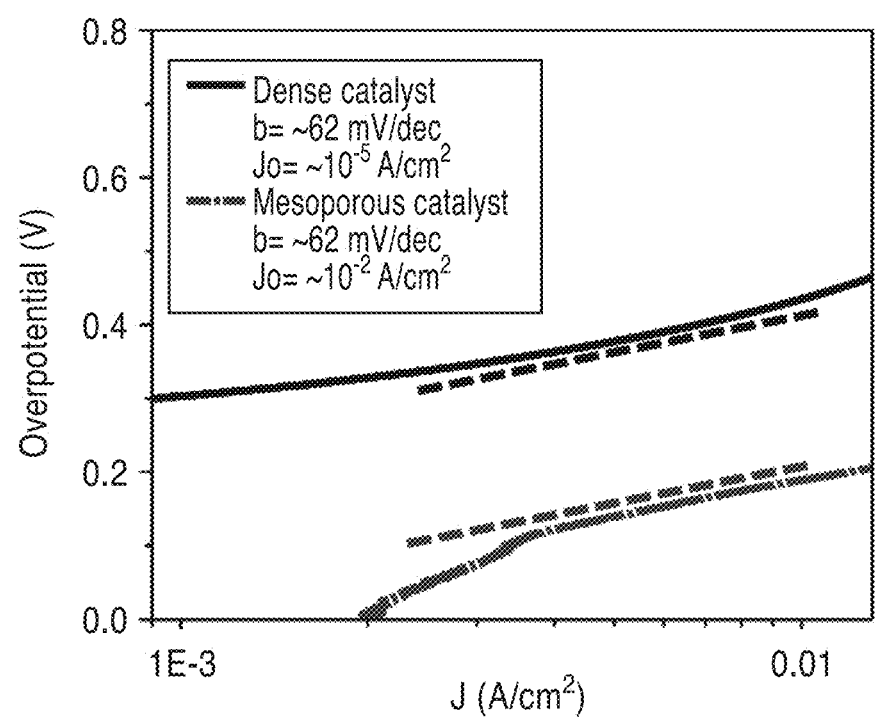

FIG. 8A is a Tafel plot for dense and porous catalysts showing catalyst stability in 1 M KOH. Here the solid lines are the experimental data and the dashed lines are the linear fits, offset from the data for clarity. Both the mesoporous and dense catalysts exhibit the same Tafel slope of about 62 mV/decade, but the exchange current of the mesoporous catalyst is 3 orders of magnitude higher than that of the dense catalyst.

Figure 8B:
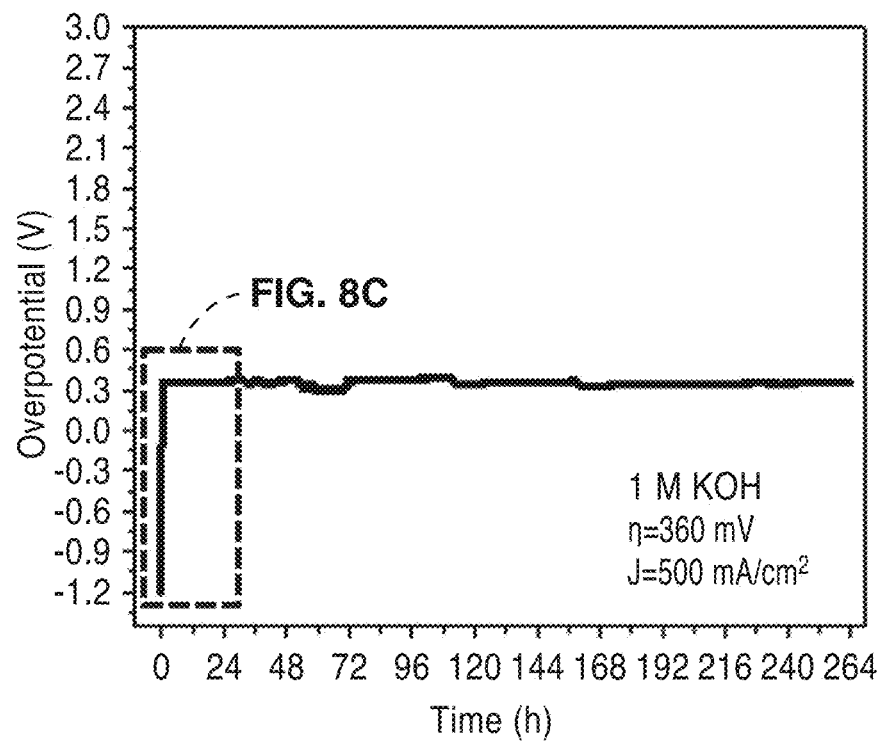

FIG. 8B is a graph of overpotential over time. In 1 M KOH, the mesoporous catalyst achieves a current density of 500 mA/cm² at 360 mV overpotential with a stability window of over 11 days.

Figure 8C:
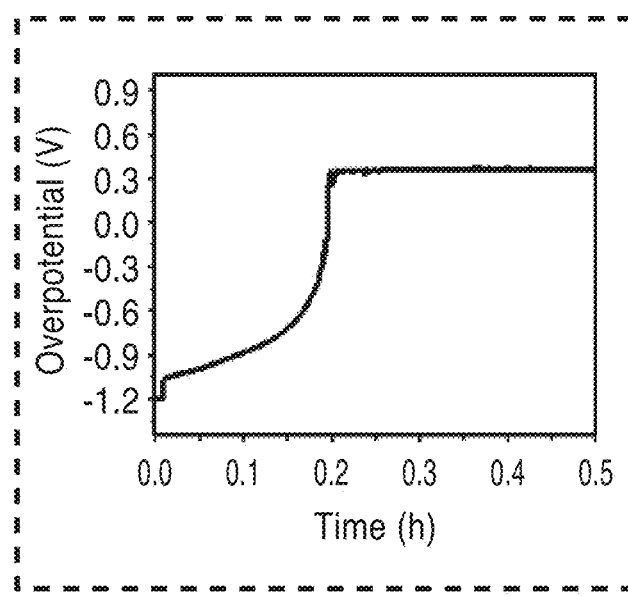

FIG. 8C is a detail of a section of the graph of overpotential over time of FIG. 8B with a smaller time scale.

DETAILED DESCRIPTION

Referring more specifically to the drawings, for illustrative purposes, embodiments of mesoporous $Ni_{60}Fe_{30}Mn_{10}$ based metal/metal oxide composite thick films for use as highly active and robust oxygen evolution catalysts are generally shown. Several embodiments of the technology are described generally in FIG. 1A through FIG. 8C to illustrate one embodiment of the fabricated catalyst material, characteristics and functionality. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

The present technology relates generally to the composition and synthesis of mesoporous $Ni_xFe_yMn_z$ alloy based metal/metal oxide composite thick films. The produced catalyst is in the general form: $Ni_xFe_yMn_z$, where (x,y,z) are approximately equal to (60,30,10) respectively. However, material compositions with the index x, y, and z quantities can be independently tuned in the following ranges: 30<x<100; 0<y<60; 0<z<40. The final compositions in these ranges can be fabricated by tuning the elemental composition of the initial Mn-rich ternary parent alloy. The minimum content of Mn in the ternary parent alloy should be high enough to induce spinal decomposition. That means that if the ternary parent alloy is rewritten in the form: $(Ni_aFe_b)Mn_t$ at %, then the index "t" should be about higher than about 50%, irrespective of the ratio between the index "a" and "b".

The ternary parent alloy is a Mn-rich system in the form $(Ni_aFe_b)Mn_t$ at %; and Mn is used as a sacrificial element to introduce porosity in the material system after dealloying (i.e. after the selective removal of the sacrificial element Mn). Other elements that are chemically more reactive than Ni and Fe could be used as sacrificial elements. A general extension of the ternary parent alloy can be written as: $(Ni_aFe_b)E_t$ where E=Mg, Al, Ti, Mn, Zn, or Ta.

The choice of the corroding medium solution for the dealloying procedure depends on the sacrificial element that is selected. The end goal is to partially or fully remove that sacrificial element from the alloy. Eventually, the less reactive elements, Fe and Ni, can be partially removed, but not fully removed by the corroding medium depending on the total time of exposure and the medium selected. Suitable corroding solutions include: 1) ammonium sulfate solutions; 2) potassium hydroxide solutions; 3) sodium hydroxide solutions; 4) hydrochloric acid solutions; 5) sulfuric acid solutions; and 6) acetic acid solutions.

The mesoporous catalyst material is particularly suitable for commercial electrolyzers that produce hydrogen by passing an electrical current through a water-based solution to produce hydrogen and oxygen. The catalyst material will lower the amount of electricity that is needed to produce hydrogen and oxygen from water. The hydrogen produced in that way can then be stored in tanks and fed into fuel cell to produce electricity as needed, for example. A mesoporous $Ni_{60}Fe_{30}Mn_{10}$-based catalyst, made by partial removal of Fe and Mn from Mn-rich ternary parent alloy with composition $Ni_{15}Fe_{20}Mn_{65}$ at % is used to illustrate the technology.

In order to demonstrate the functional capabilities of the catalyst electrode and fabrication processes, several electrodes were produced and tested. Electrochemical characterization of the mesoporous $Ni_{60}Fe_{30}Mn_{10}$-based catalyst film electrode was also conducted with a standard three-electrode electrochemical cell.

Initially, the parent alloys are made from selected elements in suitable concentrations that are combined and alloyed. Suitable metals for the alloys include the transition metals, noble metals and at least one metal that capable of being selectively etched leaving behind a sponge-like structure of the more noble element or elements with a uniform and open porosity. Nickel-iron catalysts with a Ni:Fe ratio of 2:1 provides the best activity and the composition of the parent alloy and dealloying conditions were selected to produce a final alloy with this ratio.

A home-built electric arc furnace was used to make the parent alloys from the component elements (Ni, Fe, Mn) in the powder form. The NiFeMn ternary alloy may be made by melting together pure Ni, Fe and Mn using an electric arc furnace with ultra-high purity argon atmosphere. The three elements used to make the parent alloys were in powder form. The powders were thoroughly mixed at the proper stoichiometry ($Ni_{15}Fe_{20}Mn_{65}$ at. %, which corresponds to $Ni_{15.8}Fe_{20.1}Mn_{64.1}$ wt. %), and consolidated by pressing them into pellets at 2.5 tons of force in a 13 mm die.

The samples were then melted using an electric arc furnace, under one atmosphere of ultra-high purity argon. Those samples were fully melted into the liquid state and then allowed to cool. The alloy button acquired a spherical shape, which is an indication that the three metallic components were fully melted and mixed. Next, the samples were flipped and re-melted a minimum of four times to ensure thorough mixing to produce a homogeneous alloy pellet. The local temperature used to melt the parent alloy ($Ni_{15}Fe_{20}Mn_{65}$ at. %) was around 1500° C., which is higher than the melting point of all of the component elements (melting point Ni: 1453° C., melting point Fe: 1204° C., melting point Mn: 1244° C.).

Two binary parent alloys with composition $Ni_{30}Mn_{70}$ at. % and $Fe_{40}Mn_{60}$ at. % were melted in a similar way and used to make mesoporous samples for control experiments. The parent alloys were then cold-rolled from an initial thickness of about 7 mm down to submillimeter thicknesses (about 0.3 mm). Since cold-rolling reduces the grain size in the material and introduces stresses and defects in the crystal structure, the preferred cold-rolling process was performed in 3 steps. First the pellet was reduced from about 7 mm down to about 2 mm, then from about 2 mm down to about 0.7 mm, and finally from about 0.7 mm down to about 0.3 mm. The material was heated at 750° C. for 30 minutes under flowing argon between each of these cold-rolling steps. These heat treatment steps are performed to recrystallize the material and release stresses introduced during the cold-rolling steps.

Subsequent elemental characterization of the samples can be optionally performed to elucidate the post-arc melted stoichiometry. The synthesized parent alloys were then cold-rolled and dealloyed in 1 M aqueous solution of ammonium sulphate.

The parent alloys that were prepared were then processed with dealloying to produce mesoporous $Ni_{60}Fe_{30}Mn_{10}$ metal/metal oxide composites. The selective removal of Mn and Fe from the $Ni_{15}Fe_{20}Mn_{65}$ at % parent alloy was performed in a 1 M aqueous solution of $(NH_4)_2SO_4$.

The total corrosion time depends on the thickness of the parent alloy and on the amount of residual Mn that can be tolerated in the final dealloyed material. In the case of a 300 μm-thick parent alloy, 48 hours were required to take the content of Mn and Fe from $Ni_{15}Fe_{20}Mn_{65}$ at. % down to $Ni_{60}Fe_{30}Mn_{10}$ at. %. It was noted that during the free-corrosion process, the 1 M $(NH_4)_2SO_4$ corroding solution turned brown. The brown color was attributed to ferric ions ($Fe^{3+}$). Iron from the parent alloy likely dissolves in the form of ferrous ions ($Fe^{2+}$), which are then further oxidized to ferric ions in solution. During the free-corrosion process, the brown solution was periodically (about every 4 hours) replaced by a fresh 1 M $(NH_4)_2SO_4$ corroding solution. The dealloyed material was rinsed in deionized water and then in ethanol followed by drying in an argon atmosphere. Note that direct exposure of the sample to air for drying can cause it to ignite if it is not fully dealloyed. Ignition is attributed to the burning of residual Mn metal in air.

To further demonstrate the processes and test materials, other parent alloy compositions were prepared. In particular, mesoporous $Ni_{90}Mn_{10}$ metal/metal oxide and mesoporous $Fe_{90}Mn_{10}$ metal/metal oxide catalysts were produced and tested.

To make these materials, binary alloys with compositions $Ni_{30}Mn_{70}$ at. % and $Fe_{40}Mn_{60}$ at. % were first made and used as parent alloys for the synthesis of porous $Ni_{90}Mn_{10}$ and porous $Fe_{90}Mn_{10}$ by selective removal of Mn. Mn was then selective removed in a 1 M aqueous solution of $(NH_4)_2SO_4$, again following the procedure described above. In the case of the $Ni_{30}Mn_{70}$ system, the 1 M aqueous $(NH_4)_2SO_4$ corroding solution of does not turn brown because there is no Fe in this material system. The minimum dealloying time needed to bring the Mn content down to 10 at. % was also 48 hours for about 300 μm-thick samples of both $Ni_{30}Mn_{70}$ and $Fe_{40}Mn_{60}$. A monolithic piece of mesoporous $Ni_{90}Mn_{10}$ is obtained at the end of the dealloying process.

In the case of the $Fe_{40}Mn_{60}$ system, the initial amount of Fe was intentionally kept high (40 at %) to compensate for Fe dissolution during the free-corrosion process. Despite this fact, in contrast to the monolithic piece of mesoporous $Ni_{90}Mn_{10}$, the dealloyed mesoporous $Fe_{40}Mn_{60}$ exhibited very poor mechanical stability and tended to break up into smaller pieces.

Overall, the structure and composition of the final dealloyed catalysts were found to be highly reproducible as long as the homogeneity and stoichiometry of the as-synthesized parent alloy was carefully controlled.

Figure 1A:
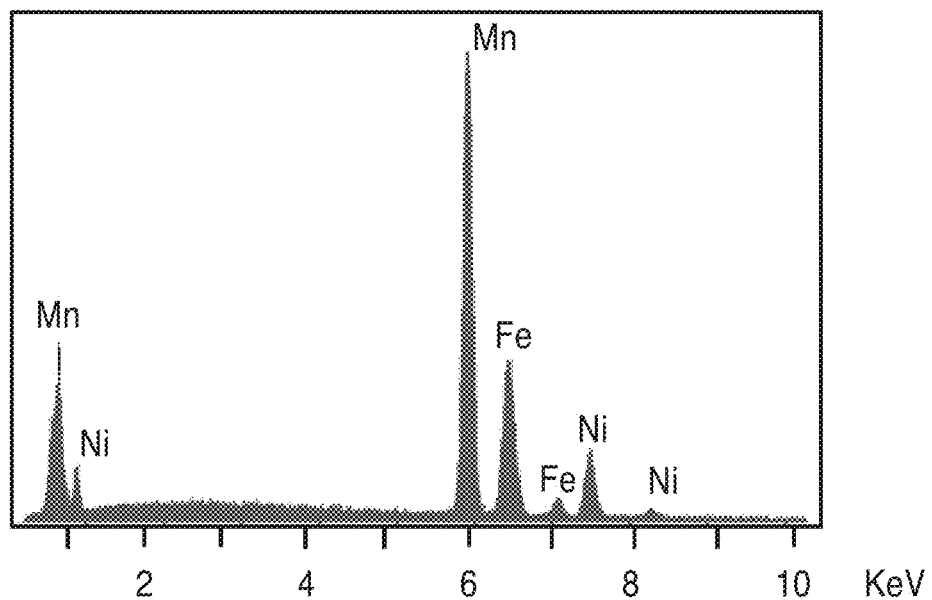
FIG. 1A is an energy dispersive x-ray spectroscopy traces for the parent alloy before dealloying.
Figure 1B:
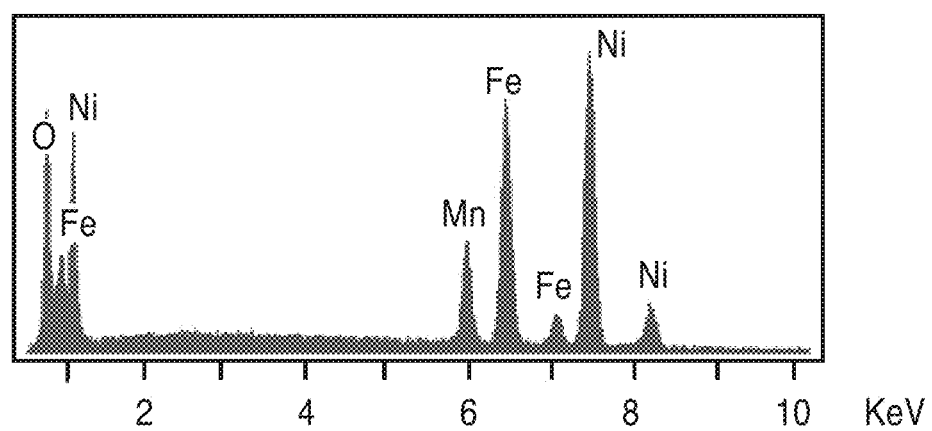
FIG. 1B is an energy dispersive x-ray spectroscopy traces for the parent alloy after dealloying. The initial Mn-rich parent alloy has lost the majority of its Mn during dealloying.
Figure 1C:
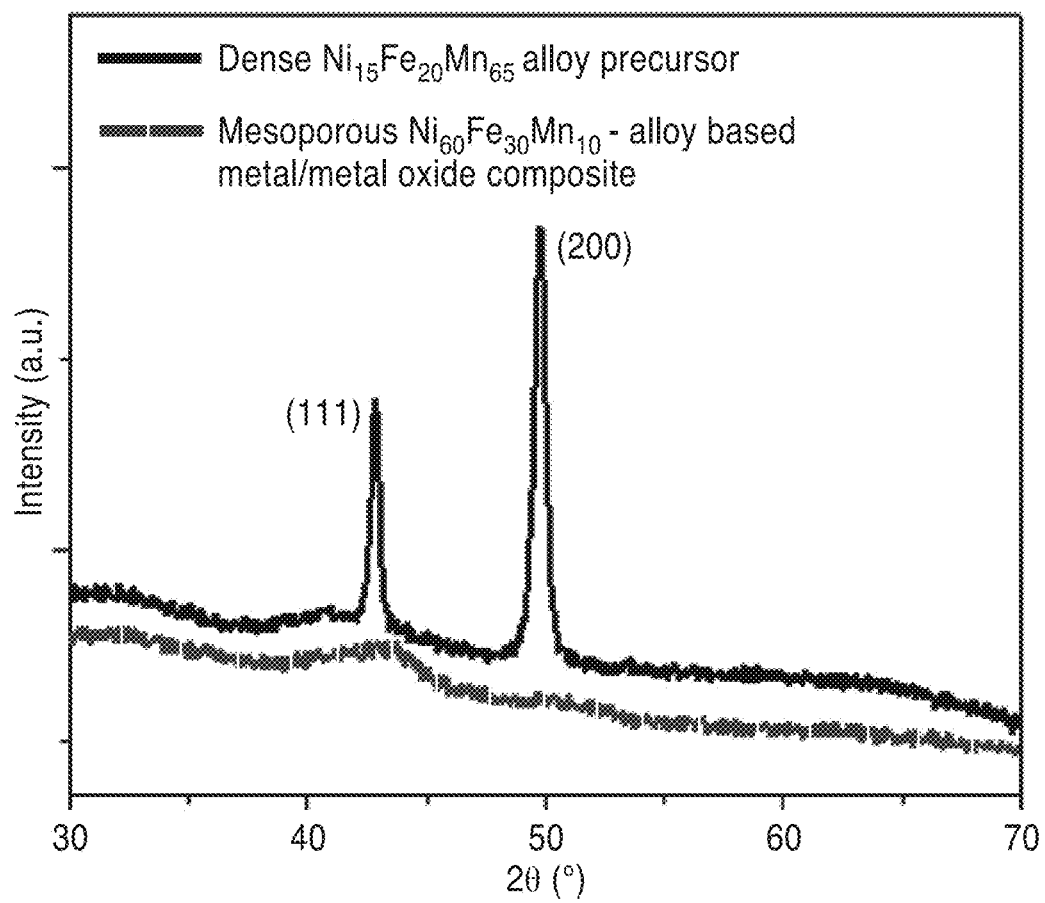
FIG. 1C is a plot of X-ray diffraction patterns for the parent alloy before and after dealloying. The parent alloy is crystalline with a cubic crystal lattice, while the corresponding dealloyed mesoporous metal/metal-oxide structure is amorphous.

Turning now to FIG. 1A through FIG. 1C, the parent alloy that was dealloyed and the final mesoporous $Ni_{60}Fe_{30}Mn_{10}$-alloy based metal/metal oxide composite thick film catalysts were tested. A JEOL Scanning Electron Microscope (SEM) with Energy Dispersive Spectroscopy (EDS) was then used to analyze the microstructure and bulk elemental composition of the samples before and after dealloying. In addition to EDS, Wavelength-Dispersive Spectroscopy (WDS) using a JEOL JXA-8200 electron microprobe equipped with a wavelength-dispersive detector was also used to confirm the bulk elemental composition of the samples. Raman spectroscopy was performed to study the metal oxide bonds in the dealloyed materials, using a Renishaw inVia Raman confocal microscope with excitation wavelength 514 nm and 200 mW laser power.

FIG. 1A and FIG. 1B show EDS traces for the parent alloy before and after dealloying. It can be seen that the initial Mn-rich parent alloy (FIG. 1A) has lost the majority of its Mn during the free-corrosion process (FIG. 1B). Although the Mn:Ni ratio dropped significantly from about 4.3 in the parent alloy down to about 0.17 in the mesoporous NiFeMn-based catalyst, there is still about 10 at. % residual Mn present in the bulk of the final mesoporous material (FIG. 1B). Since nanoparticulate NiFe-based catalysts exhibit optimal activity towards water oxidation at a Fe:Ni ratio of about 0.5, the Fe:Ni ratio in the bulk of the parent alloy drops from about 1.3 down to about 0.5 in the dealloying process. This corresponds to a bulk elemental composition of about $Ni_{60}Fe_{30}Mn_{10}$ at. % in the dealloyed mesoporous catalyst, as determined by both EDS and WDS.

The local surface composition of the dealloyed mesoporous material may affect its catalytic performance. Both EDS and WDS can be used to analyze the bulk stoichiometry of the mesoporous catalyst, but they do not provide information on the local surface composition. Therefore, the local surface composition of the dealloyed samples was analyzed using X-ray Photoelectron Spectroscopy (XPS) using a Kratos Axis Ultra DLD spectrometer with a monochromatic Al (Kα) radiation source.

XPS provides information on both metal oxidation state and on local surface composition. The results show the process produced a local surface composition of 76 at. % Ni, 16 at. % Fe, and 8 at. % Mn for a mesoporous catalyst with bulk composition 60 at. % Ni, 30 at. % Fe, and 10 at. % Mn. The data thus indicates that there is a small depletion of the more oxidatively unstable elements (Mn and Fe) at the catalyst surface.

Figure 2:
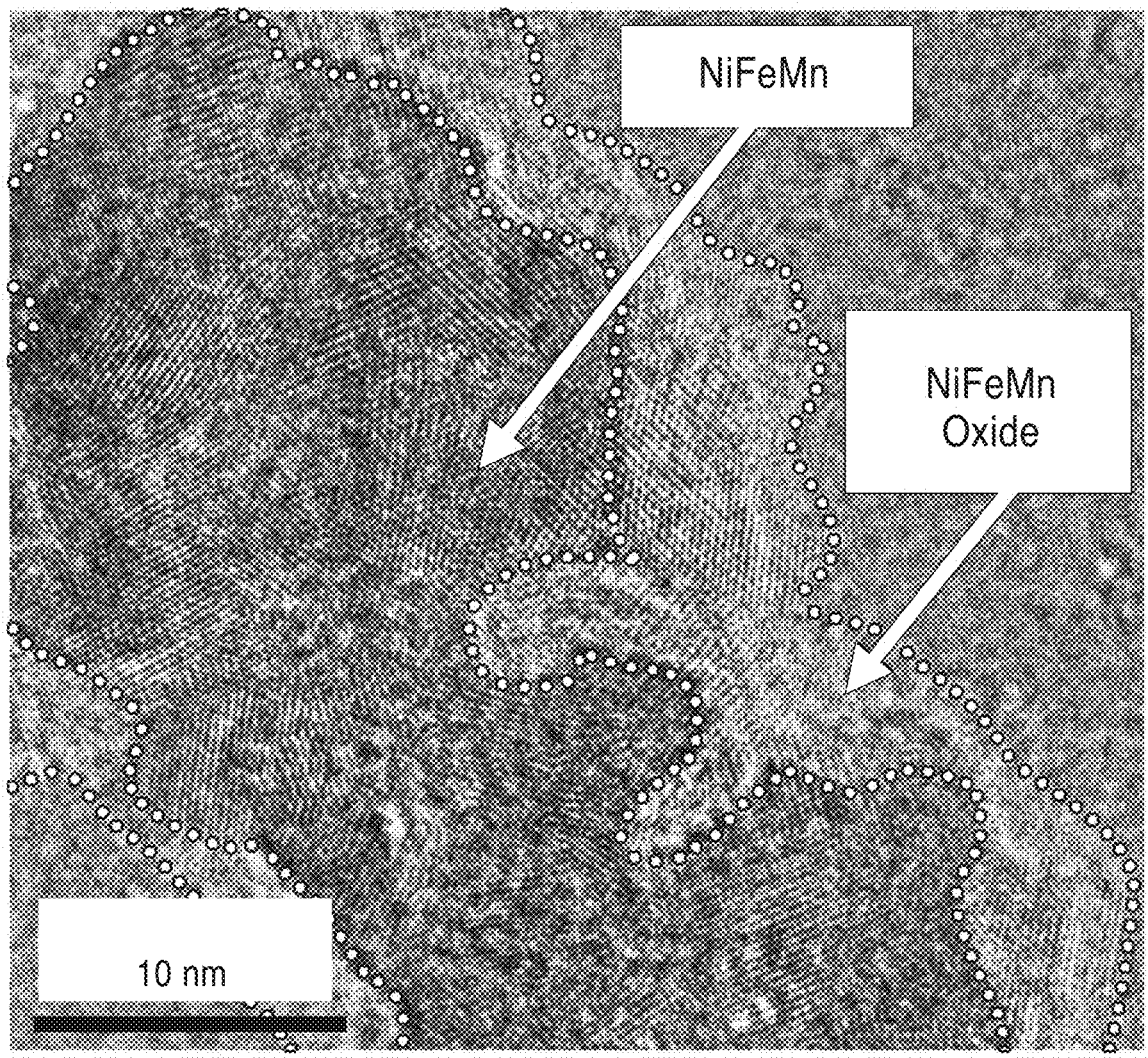
FIG. 2 is a HRTEM image of a ligament in the NiFeMn-based catalyst. The ligament is covered with an oxide layer a few nm thick, demarcated by the dashed yellow like. In contrast to the data shown in FIG. 1C, both the metal ligament and the oxide coating show lattice fringes typical of a crystalline material. Crystallinity in both components like arises from electron beam induced crystallization.

The oxidation state data from XPS is also consistent with the TEM image shown in FIG. 2, which shows a metal core completely surrounded by a metal oxide shell. All data can be fit with a single oxidation state for each element, corresponding to various metal oxides or metal hydroxides.

XPS gives a surface metal composition of $Ni_{76}Fe_{16}Mn_8$ at. % for a mesoporous catalyst with bulk metal composition $Ni_{60}Fe_{30}Mn_{10}$ at. %. This indicated that the surface is slightly depleted in the more oxidatively unstable elements: Fe and Mn. The effect of local surface composition and residual Mn was considered further when studying the performance of the mesoporous catalyst towards water oxidation.

Powder X-ray diffraction (XRD) was performed using a PANalytical X'Pert Pro diffractometer operating with Cu Kα (λ=1.5418 Å) using a 0.03° step size, an accelerating voltage of 45 kV, and a current of 40 mA. FIG. 1C shows the XRD patterns for the parent alloy before and after dealloying. While the parent alloy is crystalline with a cubic crystal lattice, the corresponding dealloyed structure is mostly amorphous, as indicated by the absence of sharp signals on the red XRD pattern. Interestingly, in a control experiment, mesoporous $Ni_{90}Mn_{10}$ at. % made from a parent alloy with composition $Ni_{30}Mn_{70}$ at. % using similar dealloying conditions to those employed for the mesoporous NiFeMn-based catalyst were found to be crystalline by XRD in the porous, partly oxidized state. The poor crystallinity in the mesoporous NiFeMn-based catalyst was in agreement with literature reports on nanoscale NiFe oxides. Furthermore, three metallic elements Ni, Fe, Mn are present in the materials system and such ternary systems having Ni and Fe as base elements are often amorphous.

HRTEM was performed in order to further investigate the nanostructure of these catalysts. An FEI Titan S/TEM High-Resolution Transmission Electron Microscopy (HRTEM) operating at 300 kV in transmission mode was used to analyze the microstructure of dealloyed specimens.

FIG. 2 is an HRTEM image that shows an oxide covered ligament of the NiFeMn-based catalyst. The oxide layer coats all surfaces and appears to be just a few nanometers thick. Interestingly, in the image of FIG. 2, both the metal ligaments and the oxide coating show lattice fringes typical of a crystalline material. While the observed crystalline domains are quite small, a sample with this degree of crystallinity should show stronger diffraction than that observed for these materials as seen in FIG. 1C. These results suggested that the amorphous nature of these materials stems from the kinetic frustration of a ternary allow, combined with the low temperature dealloying conditions used to form the material. Upon electron irradiation in the TEM, some sample crystallization can apparently take place, but kinetical frustration prevents crystallization during room temperature dealloying. It was concluded that the amorphous nature of the material was due to a combination of ternary metals and metal oxides, combined with the low dealloying temperature used to synthesize these materials.

Figure 3:
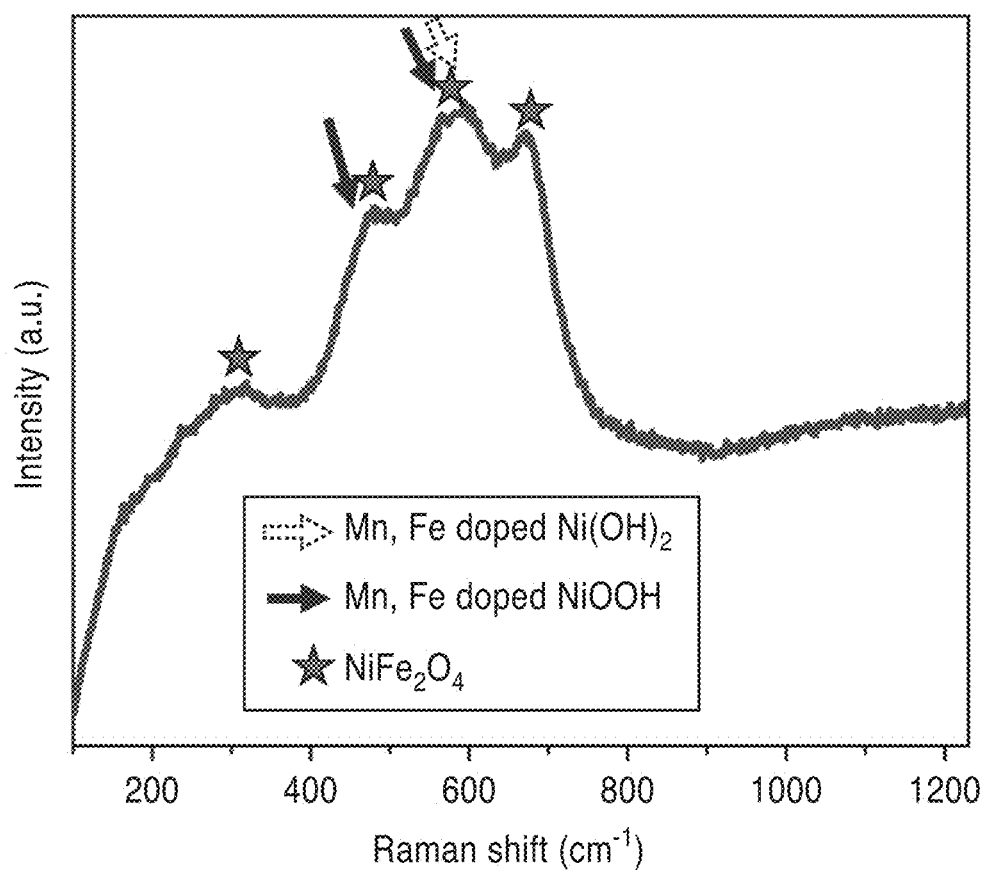
FIG. 3 is a Raman spectrum of the mesoporous $Ni_{60}Fe_{30}Mn_{10}$ metal/metal oxide composite according to one embodiment of the technology.

In order to get more insight into the nature of the oxides that are present, Raman spectroscopy can be performed on the dealloyed mesoporous $Ni_{60}Fe_{30}Mn_{10}$ metal/metal oxide composite that is in powder form (see FIG. 3). Raman spectroscopy was chosen because it is most sensitive to local bonding, and can be used to characterize bonding motifs in materials that are amorphous by XRD. The observed Raman signals in FIG. 3 are dominantly attributed to oxide species and not to the metal core, as metals generally show weak Raman intensity because of poor light penetration. Specifically, the signals observed between 300 $cm^{-1}$ and 750 $cm^{-1}$ are attributed to the superposition of various oxide and hydroxide phases.

The three components can be clearly identified from the scattering. As a starting point, it was noted that $Ni(OH)_2$ can be doped with a variety of transition metals, including Mn and Fe. This results in a broad Raman signal between 530 $cm^{-1}$ and 560 $cm^{-1}$, depending on the concentration of the transition metal dopant. The peak around 560 $cm^{-1}$ is thus partly attributable to Mn- and Fe-doped $Ni(OH)_2$ as seen by dashed arrows in FIG. 3.

It is well-established that during oxygen evolution, Fe-doped $Ni(OH)_2$ is converted into Fe-doped NiOOH. In a similar way, Mn-doped $Ni(OH)_2$ can also be converted into Mn-doped NiOOH. The two peaks at about 475 $cm^{-1}$ and about 555 $cm^{-1}$ shown in FIG. 3 by solid arrows are attributed to Mn- and Fe-doped NiOOH. Although these peaks usually arise from the conversion of $Ni(OH)_2$ to NiOOH during oxygen evolution, they have also been reported in aged pristine NiFe-based catalysts. In this case, the presence of NiOOH peaks suggests that the surface of the pristine mesoporous NiFe-based catalyst is already partly optimized for oxygen evolution, as it should contain some sites that can act as active sites for oxygen evolution. The presence of NiOOH at the surface of the catalyst is also indicated by XPS data.

Finally, besides Mn- and Fe-doped $Ni(OH)_2$ and Mn- and Fe-doped NiOOH, the 4 peaks marked with stars in FIG. 3 match reasonably well with the characteristic signals of $NiFe_2O_4$, which shows reference peaks at 333, 487, 571, and 704 $cm^{-1}$. $NiFe_2O_4$ shows good corrosion resistance during oxygen evolution, so it is an ideal oxide to serve as the support for the catalytically active hydroxide and oxyhydroxide phases.

In addition to examining local bonding geometries, the network connectivity in the materials was also examined. Because the mesoporous $Ni_{60}Fe_{30}Mn_{10}$ metal/metal oxide composite is only partially oxidized, it exhibited very good electrical conductivity. The bulk electrical resistance of a 300 μm-thick mesoporous $Ni_{60}Fe_{30}Mn_{10}$ metal/metal oxide composite catalyst was found to be on the order of 10 $\Omega/cm^2$. This value is 7 orders of magnitude lower than that of a fully oxidized NiFeMn counterpart (about $10^8$ $\Omega/cm^2$). For comparison, the electrical resistance of copper foil measured in the same way was found to be approximately $10^{-1} \Omega/cm^2$.

Figure 4A:
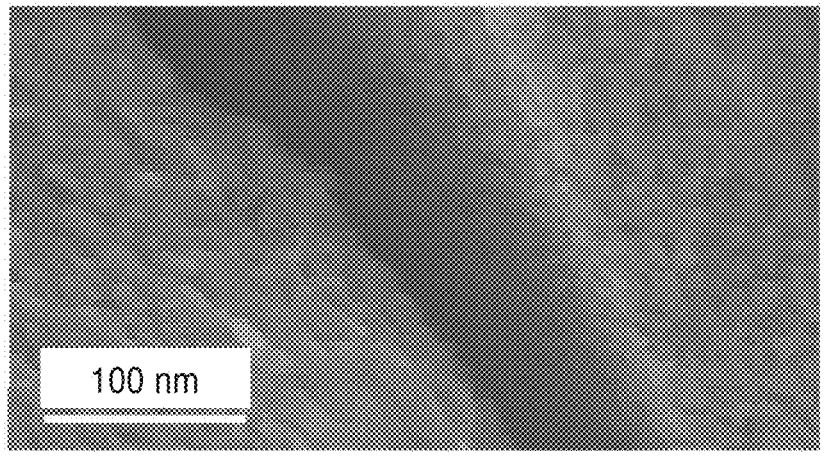
FIG. 4A is a scanning electron micrograph showing a fracture cross-section of a 300 μm-thick mesoporous catalyst at 100 μm magnification.
Figure 4B:
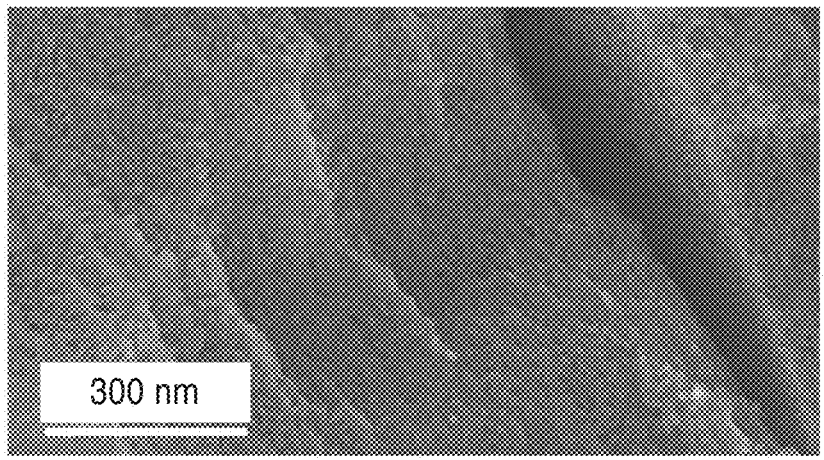
FIG. 4B is a scanning electron micrograph showing a fracture cross-section of a 300 μm-thick mesoporous catalyst at 300 μm magnification. The ligament size is on the order of 10 nm. The layered pattern comes from cold-rolling the parent alloy down to the desired thickness before dealloying.

Finally, the pore size and the size of the ligaments in the mesoporous catalyst films were characterized using SEM. FIG. 4A and FIG. 4B shows two scanning electron micrographs of a fracture cross-section of the mesoporous $Ni_{60}Fe_{30}Mn_{10}$-based catalyst at different magnifications. It can be seen that feature sizes are of the order of 10 nm. The layered pattern comes from cold-rolling the parent alloy down to the desired thickness of 300 μm. Such patterns are even more pronounced in cold-rolled soft noble metals, as previously reported elsewhere.

Nitrogen adsorption tests were also performed in order to further characterize the porosity of the fabricated dealloyed material. Nitrogen porosimetry was carried out using a Micromeritics TriStar II 3020 porosimeter. The surface area could then be calculated from the adsorption branch of the isotherm at low relative pressures using the Brunauer-Emmett-Teller (BET) model. The pore diameter and pore volume were also derived from the adsorption branch of the isotherm using the Barret-Joyner-Halenda (BJH) model.

Figure 5A:
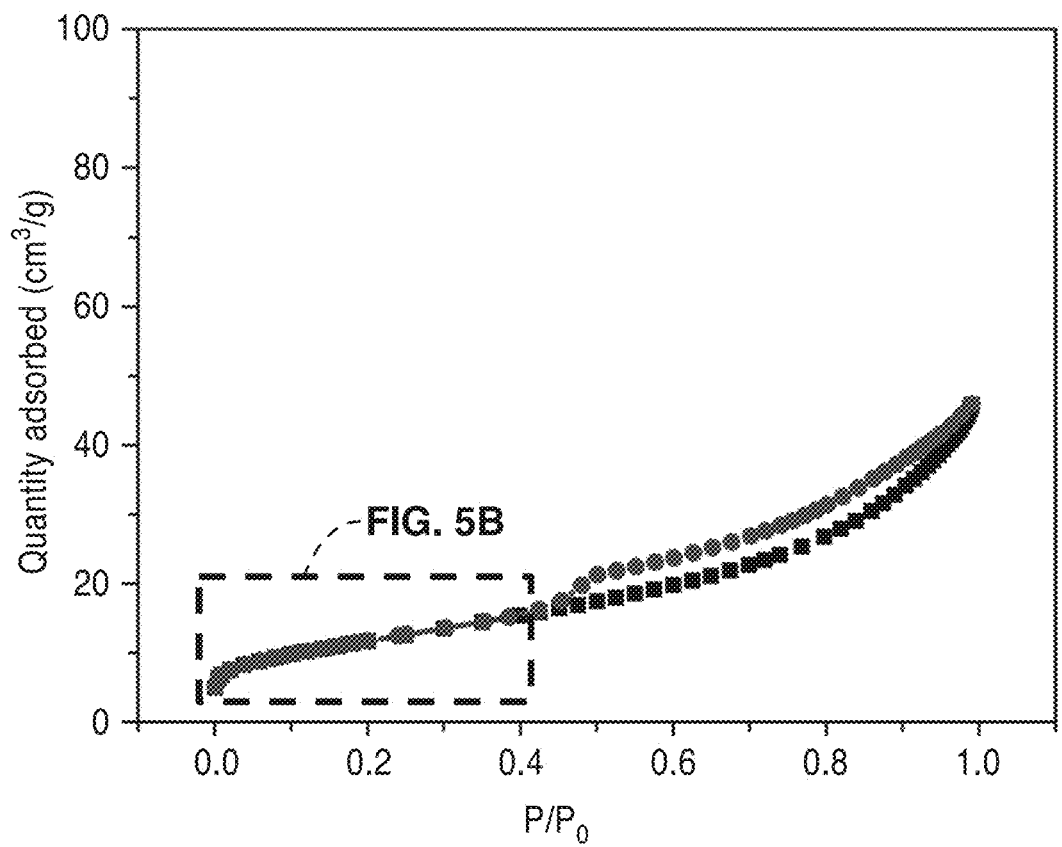
FIG. 5A is a plot of nitrogen adsorption (squares) and desorption (circles) isotherms.
Figure 5B:
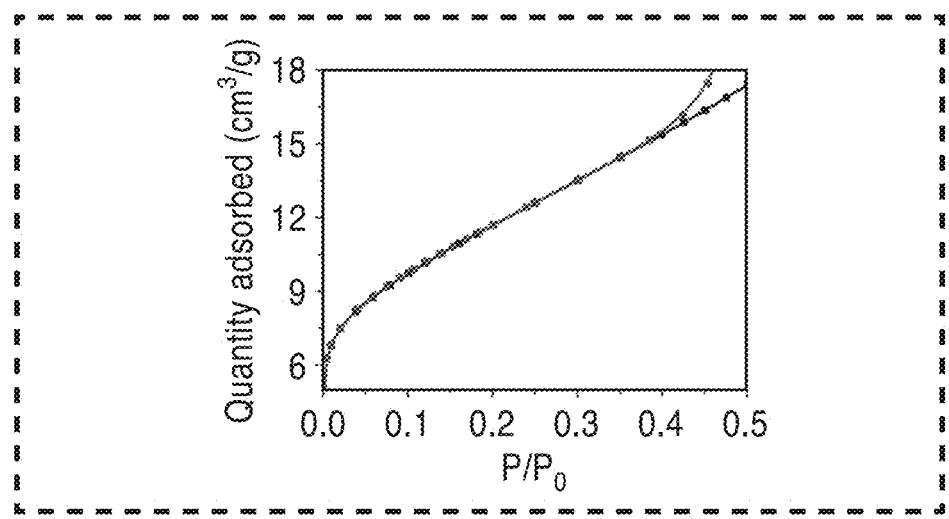
FIG. 5B is the linear regime at low relative pressures (dashed box of FIG. 5A) that was used to calculate the BET specific surface area of the mesoporous catalyst.

FIG. 5A shows nitrogen adsorption (square) and desorption (circle) isotherms obtained for the mesoporous NiFeMn-based catalyst. Two distinct regions are observed. At high relative pressures, a hysteresis loop associated with capillary condensation is observed, corresponding to a Type IV isotherm, based on IUPAC classification. At lower relative pressures, linear behavior is observed that is associated with monolayer adsorption as seen in FIG. 5B. The low pressure data was used to evaluate the specific surface area using the BET method. The corresponding BET surface area was found to be about 43 $m^2/g$. This is more than 7 times higher than the average BET surface area of many noble nanoporous metals such as nanoporous silver. Volume weighted BJH pores size analysis puts the average pore size of the fabricated mesoporous NiFeMn-based catalyst at about 10 nm. This value agrees well with the pore size estimations from the SEM images.

It was also noted that mesoporous $Ni_{90}Mn_{10}$-based and $Fe_{90}Mn_{10}$-based samples both made from binary parent alloy precursors and used in control studies exhibited somewhat higher BET surface areas, specifically, 103 m²/g for the mesoporous $Ni_{90}Mn_{10}$-based material and 206 m²/g for the $Fe_{90}Mn_{10}$-based material. These higher surface area values are explained by slightly smaller pore size distributions compared to the optimized mesoporous NiFeMn-based catalyst. These surface areas are of the same order as nanoporous Ni, Co, and Mn oxides made by hard templating methods using mesoporous silica.

Furthermore, it was demonstrated that the specific surface area of the fabricated mesoporous catalyst (about 43 m²/g) is quite high compared to those usually reported for the open cell nickel foams (<1 m²/g) commonly used to support oxygen evolution catalysts. The high specific surface area in the mesoporous NiFeMn-based system is a direct result of the small ligament size ($d_L$ about 10 nm).

Electrochemical characterization of the mesoporous catalyst using cyclic voltammetry and the effects of the high specific surface area were also conducted. An Arbin BT-2000 station was used for electrochemical characterization, in combination with a standard three-electrode electrochemical cell. For these measurements, the mesoporous $Ni_{60}Fe_{30}Mn_{10}$-based catalyst film was used as the working electrode, Pt foil was used as the counter electrode, and either Hg/HgO or Ag/AgCl was used as the reference electrode. The faradaic efficiency of the mesoporous catalyst for oxygen evolution was estimated using the water displacement method to determine the amount of gas produced.

Initially, the electrochemical signature of the free-standing thick film catalysts using successive cyclic voltammetry experiments in 0.3 M KOH, at a scan rate of 1 mV/s in the potential range between 0.1 V vs RHE (which is the open circuit voltage, Voc, for the system) and 2.0 V vs RHE were examined. For comparison, similar cyclic voltammetry experiments were performed on mesoporous $Ni_{90}Mn_{10}$ and $Fe_{90}Mn_{10}$ metal/metal oxide sample thick films also made by free-corrosion dealloying.

Figure 6:
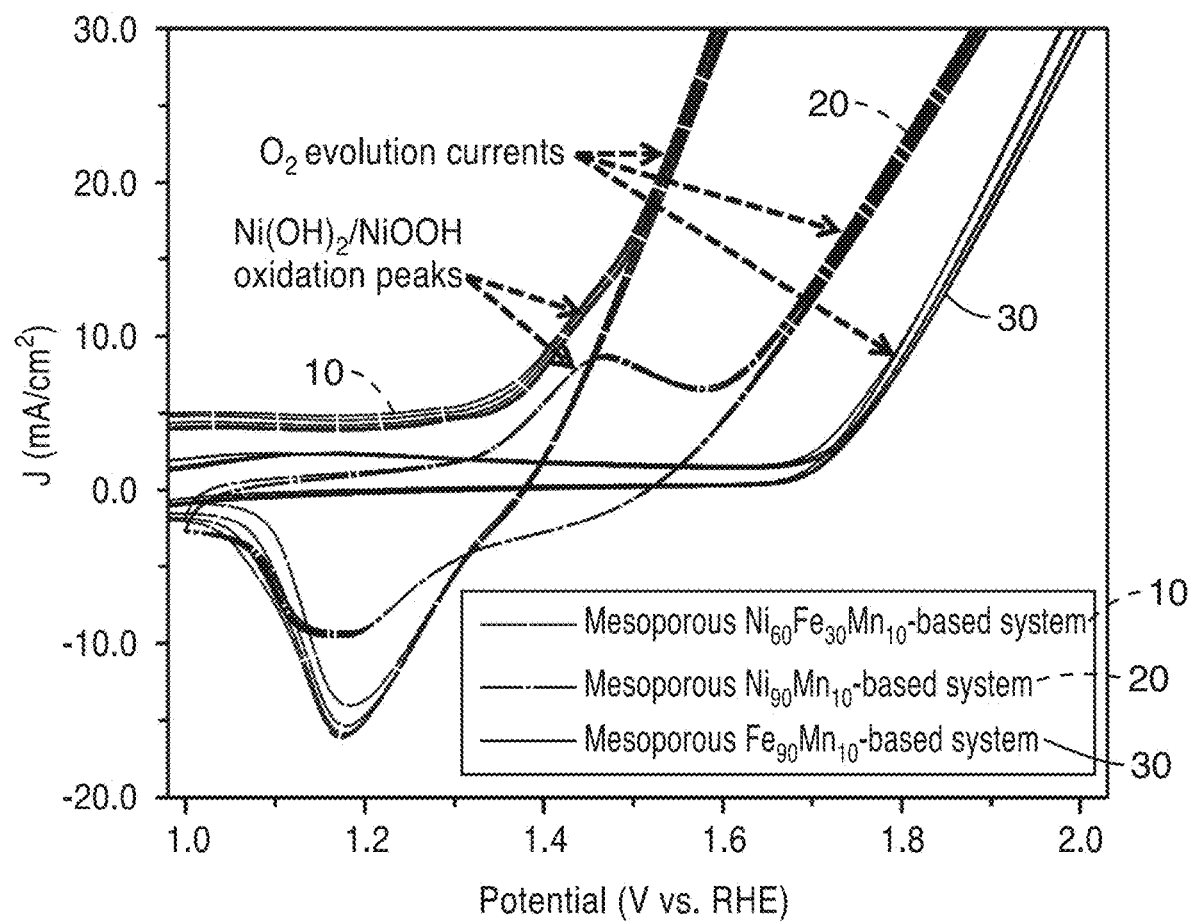
FIG. 6 is a graph of electrochemical characterization of various metal/metal-oxide catalysts in 0.3 M KOH. Successive cyclic voltammograms recorded on free-standing metal/ metal-oxide mesoporous catalysts with metal stoichiometries of $Ni_{90}Mn_{10}$ (square), $Fe_{90}Mn_{10}$ (circle), and $Ni_{60}Fe_{30}Mn_{10}$ (triangle). The $Ni_{60}Fe_{30}Mn_{10}$ sample showed the lowest overpotential for oxygen evolution.

The voltammograms 10 plotted in FIG. 6 were recorded on a free-standing mesoporous $Ni_{90}Mn_{10}$ metal/metal oxide sample. Despite the residual Mn, the sample exhibits the typical electrochemical signature of a nickel oxide electrode in alkaline medium. A pair of redox peaks is observed at 1.17 V vs. RHE during the cathodic scan and at 1.47 V vs. RHE during the anodic scan. This pair of redox peaks corresponds to the conversion of $Ni(OH)_2$ to NiOOH according to the following reaction:

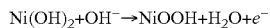

$$Ni(OH)_2 + OH^- \rightarrow NiOOH + H_2O + e^-$$

A positive oxidation current is then observed at higher voltages seen in the voltammogram 20 of FIG. 6, beyond 1.6 V vs. RHE, corresponding to oxygen evolution on NiOOH catalytic sites. For comparison, the voltammograms 30 plotted in FIG. 6 were recorded on a mesoporous $Fe_{90}Mn_{10}$ metal/metal-oxide thick film. Oxygen evolution takes place at much higher potentials for this sample, beyond 1.72 V vs. RHE.

Finally, the successive cyclic voltammograms 10 plotted in FIG. 6 were obtained from the fabricated free-standing mesoporous $Ni_{60}Fe_{30}Mn_{10}$ metal/metal oxide catalyst. For this sample, oxygen starts to evolve at just 1.47 V vs RHE, which is much lower than potentials recorded for either the mesoporous $Ni_{90}Mn_{10}$ or $Fe_{90}Mn_{10}$ metal/metal-oxide materials. A similar trend of lower overpotential in mixed metal systems has been reported previously for nanoparticles and thin films of NiFeOx-based oxygen evolving catalysts.

The current in this water oxidation reaction depends on the pH, and so for completeness, both cyclic and linear sweep voltammograms were performed on the mesoporous NiFeMn-based catalyst in 0.1 M and 1 M KOH. The freestanding porous films are mechanically somewhat fragile, so data was collected in the absence of mechanical stirring, which lowers the current because of gas bubble adhesion to the catalyst. Despite this fact, at a sweep rate of 1 mV/s, the free-standing mesoporous NiFeMn-based catalyst delivers a current density of 500 mA/cm² at about 520 mV overpotential in 1 M KOH. A range of compositions were also examined, but found very weak dependence of the catalytic activity on the precise catalyst composition for material with ratio of approximately 2:1 Ni:Fe.

The effect of the electrode architecture with high specific surface area was also evaluated. While the basic electrochemistry of these materials is similar to other nanoscale NiFeOx materials, it is the nanoscale architecture that sets the performance of this system apart. As mentioned above, the three-dimensional nickel foam scaffolds commonly exploited as supports for oxygen-evolving catalysts exhibit very low interfacial surface areas due to their large pore sizes.

In contrast, the materials described here have much higher surface areas, and this produces significant enhancement of the catalytic activity of the NiFe-based oxygen evolution catalyst. To illustrate this, the activity of an approximately 300 μm-thick free-standing mesoporous $Ni_{60}Fe_{30}Mn_{10}$ metal/metal-oxide catalyst was compared to that of an approximately 30 μm-thick free-standing dense $Ni_{60}Fe_{30}Mn_{10}$ metal/metal-oxide foil counterpart. The dense foil was obtained simply by cold-rolling the mesoporous catalyst (sandwiched between pieces of stainless steel), to collapse the pores and produce a dense sample with the exact same composition as the porous material. FIG. 7A shows two linear sweep voltammograms recorded on the mesoporous (gray) and the dense (black) catalysts at a sweep rate of 1 mV/s in 0.5 M KOH. The effective interface surface area of the mesoporous catalyst was estimated from its mass and the measured BET specific surface area of 43 m²/g to be about 3×10⁴ cm² per geometrical unit of film area (i.e. per cm²). FIG. 7A illustrates that the catalytic activity of the mesoporous sample is significantly enhanced. In 0.5 M KOH, only 200 mV overpotential is required to achieve a current density of 10 mA/cm² at a sweep rate of 1 mV/s.

For comparison, a 430 mV overpotential is needed for the dense catalyst counterpart to achieve the same current density as seen in FIG. 7B. Since both catalysts were free-standing, the electrolyte solution was not stirred in order to prevent the unsupported catalysts from breaking.

The intrinsic kinetic limitations of the mesoporous and the dense catalysts can be further examined by calculating the Tafel slope. At relatively low overpotentials, the two catalysts exhibit the same Tafel slope of about 62 mV/decade, as shown in FIG. 8A. The fact that the Tafel slopes are identical is expected, given that the two catalysts are derived from the same material system. The mesoporous catalyst Tafel slope is somewhat higher than those reported in the literature for optimized NiFe-based oxygen-evolving catalysts, which are usually around 40 mV/decade or lower. The small increase in the Tafel slope can potentially be explained by the residual Mn present at the surface of the mesoporous NiFeMn-based catalyst.

Although $Ni(OH)_2$ can be doped with both Mn and Fe, the catalytic activity of Fe-doped $Ni(OH)_2$ towards water oxidation is superior to that of Mn-doped $Ni(OH)_2$. The fabricated materials were not optimized solely for catalytic activity, however, as is the case for many of the nanoparticle and thin film systems reported in the literature. Instead, the system is optimized for the best combination of robustness, ideal porosity, electrical conductivity, and catalytic activity.

The exchange currents of the mesoporous catalyst and dense catalyst were also determined from the Tafel plots shown in FIG. 8A. There is roughly 3 orders of magnitude difference in the exchange current of the mesoporous catalyst ($J_o$ about $10^{-2}$ A/cm$^2$) compared to that of the dense catalyst ($J_o$ about $10^{-5}$ A/cm$^2$). This difference arises from the 4 orders of magnitude difference in the effective surface area of the mesoporous catalyst (about $3 \times 10^4$ cm$^2$ per cm$^2$) and that of the dense catalyst (2 cm$^2$ per cm$^2$). This indicates that the observed enhancement of the catalytic current comes mainly comes from the large interface surface area of the mesoporous material. The difference between $J_o$ values ($10^3 \times$) compared to the surface area values ($10^4 \times$) may be explained either by internal surface area in the porous system that is accessible to nitrogen gas (during BET), but not to water because of the small pore size, or to some residual porosity in the rolled sample, which was assumed to be fully dense. However, the large internal surface area alone could not result in the observed catalytic performance if the 300 μm-thick mesoporous NiFe-based electrode material was electrically insulating. The high performance of the 300 μm-thick robust mesoporous NiFeMn-based electrode material is justified by the combination of the high surface area, the Fe-doped and Mn-doped NiOOH catalytic sites, and the high bulk electrical conductivity of the mesoporous material system, which facilitates the collection of the 4 electrons involved in the oxygen evolution reaction. In addition to that electronic charge transfer, the transfer of chemical species ($H_2O$, $OH^-$ and $O_2$) at the catalyst/electrolyte interface is facilitated by the open pore architecture of the catalyst.

The Faradaic efficiency of the fabricated catalysts was estimated using the water displacement method to determine the amount of oxygen gas produced. Briefly, evolved gas was equilibrated across two bubblers, and was collected in a water manometer. The total volume of oxygen evolved was then calculated using the total volume change in the manometer and the assumption of 2:1 hydrogen:oxygen evolution, corrected for the increase in oxygen solubility as a consequence of the increase in the gas pressure of the system during gas evolution. The Faradaic Efficiency (FE) for oxygen evolution was then deduced as the ratio between the anodic out-put electric charge (3.01 C) associated with the measure oxygen gas, divided by the anodic input charge (3.10 C) applied to oxidize the water. This gives a faradaic efficiency for oxygen evolution to be approximately 97%. A similar FE value was previously measured on NiFe-based oxygen evolution catalyst using a different experimental method.

The stability of the catalyst under an extremely high current density was also tested. The stability of the mesoporous catalyst during oxygen evolution was investigated. Besides the relatively large overpotentials required by many oxygen-evolving catalysts, another key drawback of many systems is their rapid failure due to corrosion during oxygen evolution. The durability of the fabricated catalyst was evaluated during galvanostatic tests in 1 M KOH.

The stability test of greatest interest is one where the applied current density is comparable to those used for real applications, such as in commercial alkaline electrolyzers, where high electrical current densities are passed through water-based solutions to decompose them into hydrogen and oxygen as the only products. Therefore, a current density of 500 mA/cm$^2$ was used to investigate the stability of the new mesoporous catalyst. To prevent the bulk mesoporous catalyst from cracking due to mechanical stresses associated with the large amount of oxygen gas released at this high current density, the catalyst was sandwiched between two pieces of open cell nickel foam foil. This configuration also allowed mechanical stirring of the electrolyte during the process using a magnetic stirring bar. Under these conditions, the mesoporous catalyst exhibited an activity of 500 mA/cm$^2$ at 360 mV overpotential for over eleven days and shown in FIG. 8B and FIG. 8C. The purpose of the nickel foam was only to add mechanical stability to the mesoporous catalyst, and so it is important to insure that the nickel foam does not contribute to the catalytic activity. As a result, the activity of the nickel foam alone (i.e. without a mesoporous $Ni_{60}Fe_{30}Mn_{10}$-based catalyst thick film) at a current density of 500 mA/cm$^2$ was also tested. Water oxidation on the nickel foam started at 1.79 V vs RHE (560 mV overpotential). Within an hour, the water oxidation potential further increased from 1.79 V vs RHE to the set upper voltage limit of 2V vs RHE, corresponding to an overpotential of 770 mV. This increase, which was presumably due to oxidation of the nickel foam, indicating that under experimental conditions (i.e. at a current density of 500 mA/cm$^2$), the nickel foam itself is not stable for water oxidation.

In contrast to the pure nickel foam, the mesoporous $Ni_{60}Fe_{30}Mn_{10}$ metal/metal-oxide catalyst-nickel foam sandwich exhibits very different time-voltage profiles. Typically, when the mesoporous catalyst is sandwiched between the nickel foam, water oxidation does not start immediately. Rather, the potential rapidly increases within the first 15 minutes from the open circuit voltage (0.0 V vs RHE) up to 1.59 V Vs RHE, corresponding to 360 mV overpotential as seen in FIG. 8C. This initial stage can be attributed to equilibration of the cell. At that overpotential of 360 mV, oxygen starts to evolve. The voltage and the oxygen evolution then remain constant for 11 days as displayed in FIG. 8B. At that time, the catalyst showed no signs of degradation, but the experiment was intentionally stopped. This stable performance with no sign of degradation is in stark contrast to many other reports in the literature. Typical NiFe based water oxidation catalysts operating in 1 M KOH have been observed to show lifetimes between 1 and 4 days at current densities of just 20 mA/cm$^2$.

Finally, the role of residual Mn on the performance of the mesoporous NiFeMn-based catalyst was evaluated. Elsewhere, the effect of transition metal doping, including Mn- and Fe-doping, on the catalytic activity of Ni-based double hydroxides towards oxygen evolution has been investigated. It has been suggested that in Ni-based double hydroxides catalysts, the active sites are an oxyhydroxide type in the form NiMOOH, where M is a transition-metal dopant (Fe, Mn . . . ), in which the metals form octahedral $NiO_6$ and $MO_6$ complexes.

In the case of the mesoporous NiFeMn-based catalyst, the primary active sites should be Fe-doped Ni oxides (NiFeOOH). In addition, since XPS data reveals the presence of some Mn at the surface of the mesoporous NiFeMn-based catalyst, the Mn-doped Ni oxides (NiMnOOH) could represent other active sites.

In the case of NiFe-oxides, it is well-recognized that Fe-doping improves the performance of Ni oxides for the oxygen evolution reaction. In the case of NiMn-oxide, Mn-doping also improves the performance of Ni oxides for the evolution reaction. In particular, it has been shown that NiMn-Oxide performs better than both undoped nickel oxide [$Ni(OH)_2$] and the state-of-the art $IrO_2$ catalyst. This suggests that the residual Mn-doping in the mesoporous NiFeMn-based catalyst may play an active role in the oxygen evolution reaction. However, since the activity of NiFe-Oxide >NiMn-Oxide, it is believed that the overall performance of the mesoporous NiFeMn-based catalyst could improve further if there was no residual Mn in the mesoporous material system.

In balance however, it may be that the small amount of residual Mn may improve the overall corrosion resistance behavior of the mesoporous NiFeMn-based catalyst in alkaline solution. It has been observed that Mn has a high tendency to passivate in alkaline solutions. More generally, the oxophilicity trends of the 3d transition metals that are used are as follows: Ni<Fe<Mn, and the oxophilicity of 3d transition metal oxyhydroxides have been reported to follow the same trends as that of their corresponding metallic element counterparts. Thus, passivation of both residual Mn and Mn oxides in alkaline solutions may prevent the mesoporous NiFeMn-based catalyst from further corrosion during water oxidation. As a result, while the residual Mn may be slightly detrimental in terms of catalytic efficiency, it could play a much more important and positive role in terms of catalyst stability in alkaline solutions.

From the description herein, it will be appreciated that the present disclosure encompasses multiple embodiments which include, but are not limited to, the following:

1. A nanostructured catalytic electrode, comprising: (a) a nanoporous alloy material represented by the formula $(Ni_aFe_b)E_t$ at %; (b) wherein a is in the range of 30<a<100; (c) wherein b is in the range of 0<b<60; (d) wherein t is in the range of 0<t<40; and (e) wherein E is an element selected from the group of elements consisting of Mg, Al, Ti, Mn, Zn, and Ta.

2. The nanostructured electrode of any preceding embodiment, wherein the nanoporous alloy material comprises $Ni_{60}Fe_{30}Mn_{10}$.

3. The nanostructured electrode of any preceding embodiment, further comprising a layer of oxide that substantially covers one or more surfaces of the nanoporous alloy material.

4. The nanostructured electrode of any preceding embodiment, wherein the layer of oxide has a thickness in the range of 1 nm to 10 nm.

5. The nanostructured electrode of any preceding embodiment, wherein the layer of oxide is a substantially uniform thickness with a thickness in the range of 1 nm to 50 nm.

6. The nanostructured electrode of any preceding embodiment, wherein the oxide layer is a NiFe oxide layer.

7. The nanostructured electrode of any preceding embodiment, wherein the oxide layer is a NiFeE oxide layer.

8. The nanostructured electrode of any preceding embodiment, wherein the alloy material has ligaments and pores on the order of 10 nm and has a Brunauer-Emmett-Teller (BET) surface area on the order of 43 m$^2$/g.

9. The nanostructured electrode of any preceding embodiment, wherein the alloy material has a catalytic area per cm$^2$ on the order of $3 \times 10^4$ cm$^2$.

10. The nanostructured electrode of any preceding embodiment, wherein the alloy material exhibits a catalytic activity towards water oxidation of 500 mA/cm$^2$ at 360 mV overpotential in 1 M KOH electrolyte.

11. A method for fabricating a nanostructured oxygen-evolving catalytic electrode with a stable oxide coated network for alkaline electrolysis, comprising: (a) providing a parent alloy of Ni, Fe and a sacrificial element; and (b) dealloying the parent alloy with exposure to a corroding medium; (c) wherein a portion of the sacrificial element is removed from the parent alloy to form a porous nanoporous structure; and (d) wherein a layer of oxide is formed on one or more surfaces of the nanoporous alloy material to provide a stable oxide coated nanostructured electrode.

12. The method of any preceding embodiment, wherein the parent alloy comprises an alloy material represented by the formula $(Ni_aFe_b)E_t$ at %, wherein E is a sacrificial element selected from the group of elements consisting of Mg, Al, Ti, Mn, Zn, and Ta.

13. The method of any preceding embodiment, wherein the parent alloy has a composition index t of the formula $(Ni_aFe_b)E_t$ at % that is greater than 50 at %.

14. The method of any preceding embodiment, wherein the parent alloy has a composition of $Ni_{15}Fe_{20}Mn_{65}$ at %.

15. The method of any preceding embodiment, wherein the corroding medium is a solution selected from the group of solutions consisting of an ammonium sulfate solution; a potassium hydroxide solution; a sodium hydroxide solution; a hydrochloric acid solution; a sulfuric acid solution; and an acetic acid solution.

16. The method of any preceding embodiment, wherein the nanoporous alloy material produced by dealloying the parent alloy comprises: an alloy represented by the formula $(Ni_aFe_b)E_t$ at %; wherein a is in the range of 30<a<100; wherein b is in the range of 0<b<60; and wherein t is in the range of 0<t<40.

17. The method of any preceding embodiment, wherein a ratio of index a to index b in the alloy material represented by the formula $(Ni_aFe_b)E_t$ at % is 2:1.

18. The method of any preceding embodiment, wherein the nanoporous alloy material produced by dealloying the parent alloy comprises: $Ni_{60}Fe_{30}Mn_{10}$.

19. The method of any preceding embodiment, wherein the layer of oxide is a NiFe oxide layer that has a thickness in the range of 1 nm to 50 nm.

20. The method of any preceding embodiment, wherein the layer of oxide is a NiFeE oxide layer that has a thickness in the range of 1 nm to 50 nm.

21. An electrochemical cell comprising: (a) a vessel containing an aqueous alkali electrolyte and an ion permeable membrane separating the electrolyte into a first volume and a second volume; (b) a cathode coupled to a source of current disposed in the first volume of electrolyte; and (c) a nanostructured anode catalytic anode, wherein the anode comprises: (i) an alloy material represented by the formula $(Ni_aFe_b)E_t$ at %; (ii) wherein a is in the range of 30<a<100; (iii) wherein b is in the range of 0<b<60; (iv) wherein t is in the range of 0<t<40; and (v) wherein E is an element selected from the group of elements consisting of Mg, Al, Ti, Mn, Zn, and Ta; and (vi) a layer of oxide that substantially covers one or more surfaces of the nanoporous alloy material.

22. The cell of any preceding embodiment, wherein a ratio of index a to index b in the alloy material represented by the formula $(Ni_aFe_b)E_t$ at % is 2:1.

23. The cell of any preceding embodiment, wherein the nanoporous alloy material comprises: $Ni_{60}Fe_{30}Mn_{10}$.

24. The cell of any preceding embodiment, wherein the layer of oxide is a NiFe oxide layer that has a thickness in the range of 1 nm to 50 nm.

25. The cell of any preceding embodiment, wherein the layer of oxide is a NiFeE oxide layer that has a thickness in the range of 1 nm to 50 nm.

26. The cell of any preceding embodiment, wherein the anode alloy material has ligaments and pores on the order of 10 nm and has a Brunauer-Emmett-Teller (BET) surface area on the order of 43 m$^2$/g.

27. The cell of any preceding embodiment, wherein the anode has a catalytic area per $cm^2$ on the order of $3 \times 10^4$ $cm^2$.

28. The cell of any preceding embodiment, wherein the anode exhibits a catalytic activity towards water oxidation of 500 $mA/cm^2$ at 360 mV overpotential in 1 M KOH electrolyte.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A nanostructured catalytic electrode, comprising:
   (a) a nanoporous alloy material represented by the formula $(Ni_aFe_b)E_t$ at %;
   (b) wherein a is in the range of 30<a<100;
   (c) wherein b is in the range of 0<b<60;
   (d) wherein t is in the range of 0<t<40;
   (e) wherein E is an element selected from the group of elements consisting of Mg, Al, Ti, Mn, Zn, and Ta; and
   (f) a layer of an NiFe oxide covering one or more surfaces of the nanoporous alloy material.

2. The nanostructured electrode of claim 1, wherein said nanoporous alloy material comprises $Ni_{60}Fe_{30}Mn_{10}$.

3. The nanostructured electrode of claim 1, wherein said layer of oxide has a thickness in the range of 1 nm to 10 nm.

4. The nanostructured electrode of claim 1, wherein said layer of oxide is a uniform thickness with a thickness in the range of 1 nm to 50 nm.

5. The nanostructured electrode of claim 1, wherein said layer of NiFe oxide comprises a NiFeE oxide layer, wherein E is an element selected from the group of elements consisting of Mg, Al, Ti, Mn, Zn, and Ta.

6. The nanostructured electrode of claim 1, wherein said alloy material has ligaments and pores on the order of 10 nm and has a Brunauer-Emmett-Teller (BET) surface area on the order of 43 $m^2/g$.

7. The nanostructured electrode of claim 1, wherein said alloy material has a catalytic area per $cm^2$ on the order of $3 \times 10^4$ $cm^2$.

8. The nanostructured electrode of claim 1, wherein said alloy material exhibits a catalytic activity towards water oxidation of 500 $mA/cm^2$ at 360 mV overpotential in 1 M KOH electrolyte.

9. An electrochemical cell comprising:
   (a) a vessel containing an aqueous alkali electrolyte and an ion permeable membrane separating the electrolyte into a first volume and a second volume;
   (b) a cathode coupled to a source of current disposed in the first volume of electrolyte; and
   (c) a nanostructured catalytic anode, wherein said anode comprises:
      (i) an alloy material represented by the formula $(Ni_aFe_b)E_t$ at %;
      (ii) wherein a is in the range of 30<a<100;
      (iii) wherein b is in the range of 0<b<60;
      (iv) wherein t is in the range of 0<t<40; and
      (v) wherein E is an element selected from the group of elements consisting of Mg, Al, Ti, Mn, Zn, and Ta; and
      (vi) a layer of oxide covering one or more surfaces of the alloy material.

10. The cell of claim 9, wherein a ratio of index a to index b in the alloy material represented by the formula $(Ni_aFe_b)E_t$ at % is 2:1.

11. The cell of claim 10, wherein the alloy material comprises: $Ni_{60}Fe_{30}Mn_{10}$.

12. The cell of claim 9, wherein the layer of oxide is a NiFe oxide layer that has a thickness in the range of 1 nm to 50 nm.

13. The cell of claim 9, wherein the layer of oxide is a NiFeE oxide layer that has a thickness in the range of 1 nm to 50 nm, wherein E is an element selected from the group of elements consisting of Mg, Al, Ti, Mn, Zn, and Ta.

14. The cell of claim 9, wherein said anode has ligaments and pores on the order of 10 nm and has a Brunauer-Emmett-Teller (BET) surface area on the order of 43 $m^2/g$.

15. The cell of claim 9, wherein said anode has a catalytic area per $cm^2$ on the order of $3 \times 10^4$ $cm^2$.

16. The cell of claim 9, wherein said anode exhibits a catalytic activity towards water oxidation of 500 $mA/cm^2$ at 360 mV overpotential in 1 M KOH electrolyte.

* * * * *